UNITED STATES PATENT OFFICE.

ERWIN ERLENMEYER, OF HOUSTON, TEXAS.

IMPROVEMENT IN COMPOSITIONS FOR FILLING TEETH.

Specification forming part of Letters Patent No. 159,568, dated February 9, 1875; application filed December 19, 1874.

*To all whom it may concern:*

Be it known that I, ERWIN ERLENMEYER, of Houston, Harris county, Texas, have invented a new and Improved Composition for Filling Teeth, of which the following is a specification:

This invention relates to the art of dentistry; and consists of a composition for filling hollow and decayed teeth.

In carrying out the invention I use a composition which is pulverized when used, and formed into a ball for the tooth-cavity.

The composition is formed as follows, the proportions of each of the ingredients given to form one hundred parts of the composition, viz.:

Phosphoric acid, 26.35 parts; lime, 13.72 parts; magnesia, 8 parts; fluoride of calcium, 4 parts; potash, 8.33 parts; silicic, 5.60 parts; oxide of zinc, 34 parts.

I do not confine myself to the exact proportions described, as variations may be made in them without departing from my invention.

Having thus described my invention, I claim as new, and desire to secure by Letters Patent—

The above composition for filling teeth, substantially as set forth.

ER. ERLENMEYER.

Witnesses:
ED. LORENZEN,
S. D. HEWES.